United States Patent [19]

Watanabe

[11] Patent Number: 5,060,018

[45] Date of Patent: Oct. 22, 1991

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 577,112

[22] Filed: Sep. 4, 1990

[30] Foreign Application Priority Data

Sep. 14, 1989 [JP] Japan .................................. 1-237194

[51] Int. Cl.$^5$ ........................................... G03G 15/00
[52] U.S. Cl. ..................................... 355/230; 355/75; 355/309
[58] Field of Search .................... 355/75, 76, 230, 231, 355/309

[56] References Cited

U.S. PATENT DOCUMENTS 3,888,585  6/1975  Cross ....................... 355/75
4,714,946  12/1977  Bajgert et al. ............ 355/75
4,922,292  4/1990  Watanabe .................. 355/75

Primary Examiner—Joan H. Pendegrass
Assistant Examiner—P. Stanzione
Attorney, Agent, or Firm—Foley & Lardner

[57] ABSTRACT

In an image forming apparatus, continuous document paper from which images are formed is set between a document table of an apparatus main body and a platen sheet of a platen cover. A lever is attached to the platen cover. By operating the lever, the platen sheet can be brought into contact with the document table or separated therefrom while the platen cover is closed. When the platen sheet is separated from the document table 3, the set continuous document paper can be conveyed while the platen cover is closed.

16 Claims, 13 Drawing Sheets

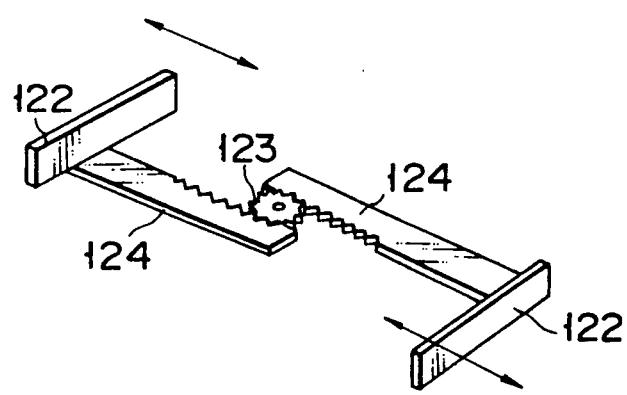
F I G. 9

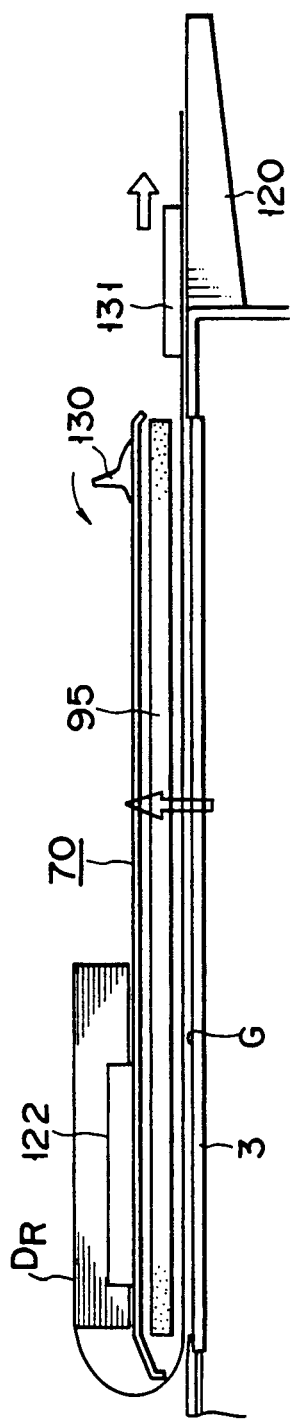
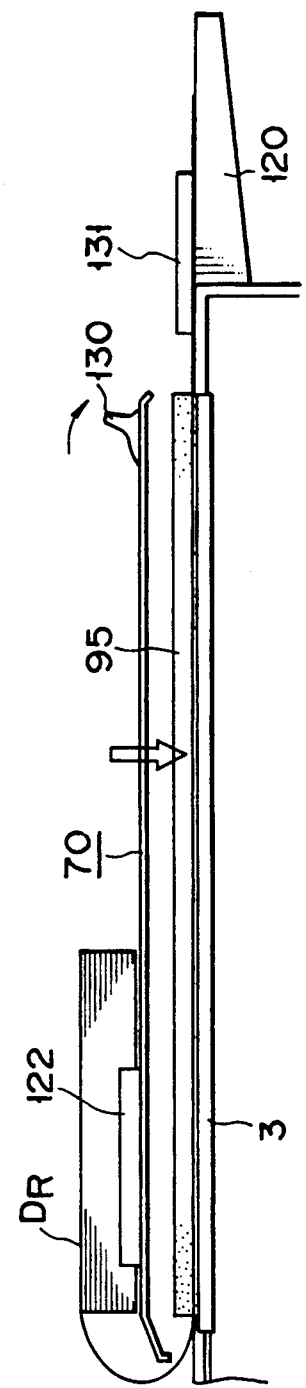
FIG. 10
FIG. 11

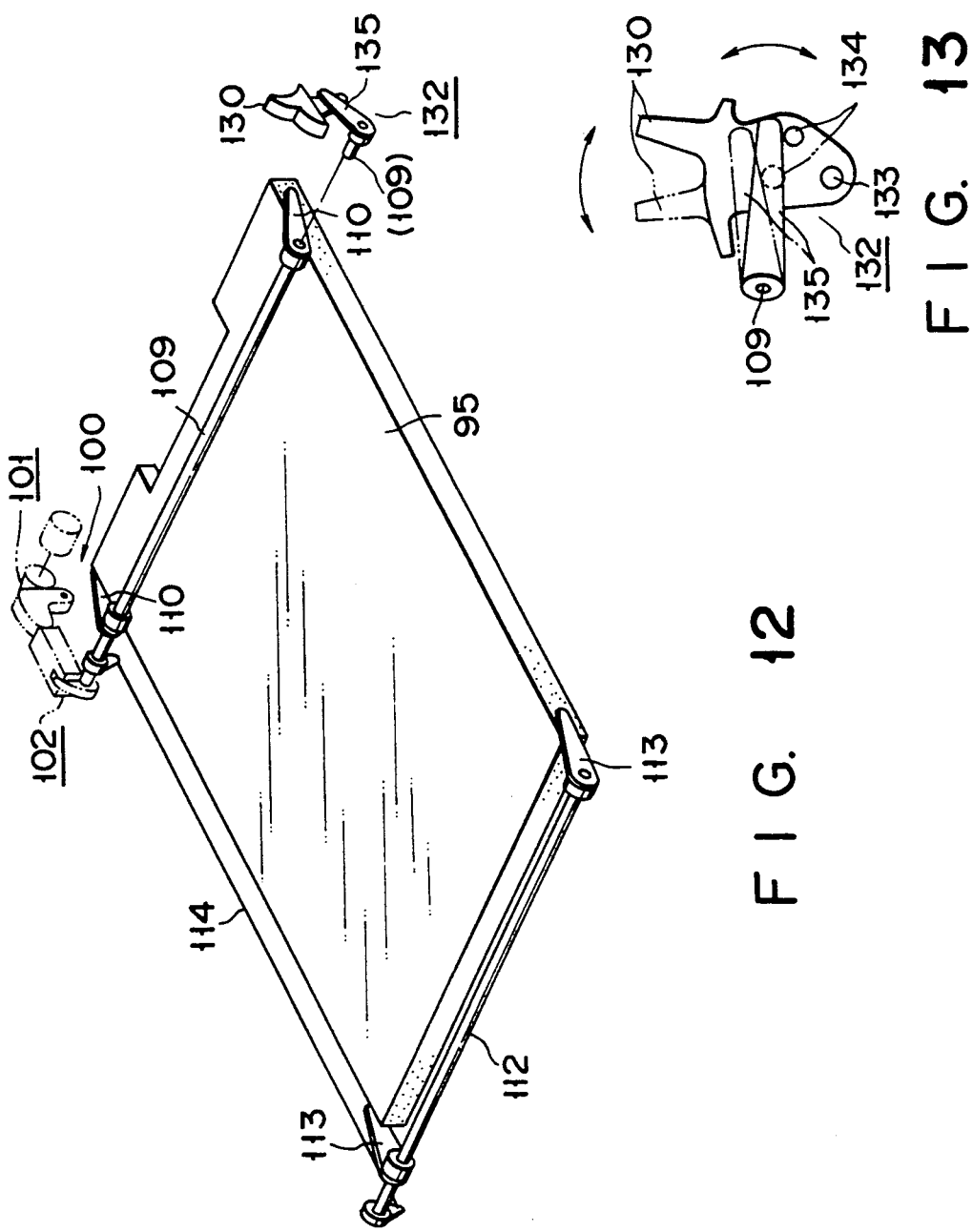

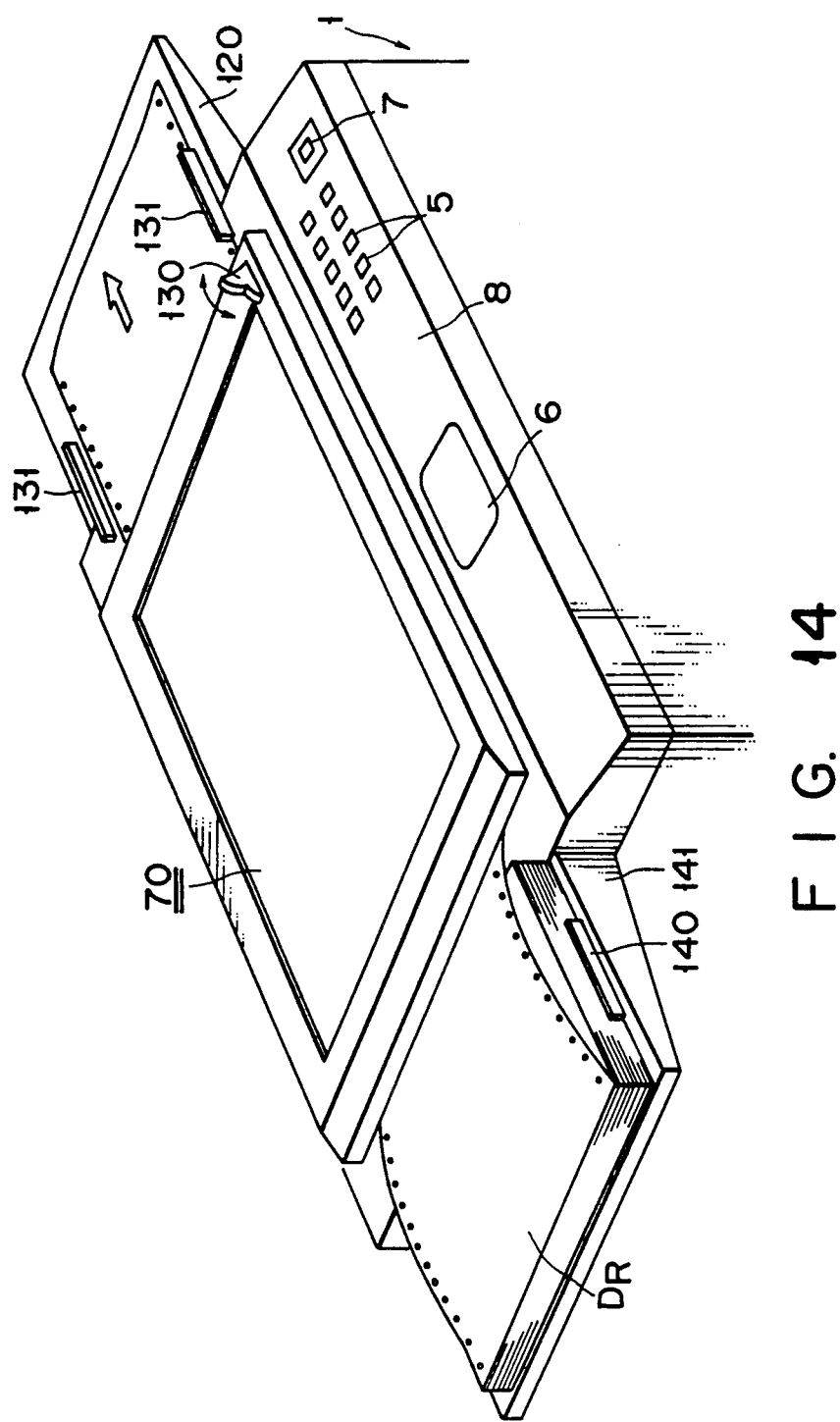
F I G. 14

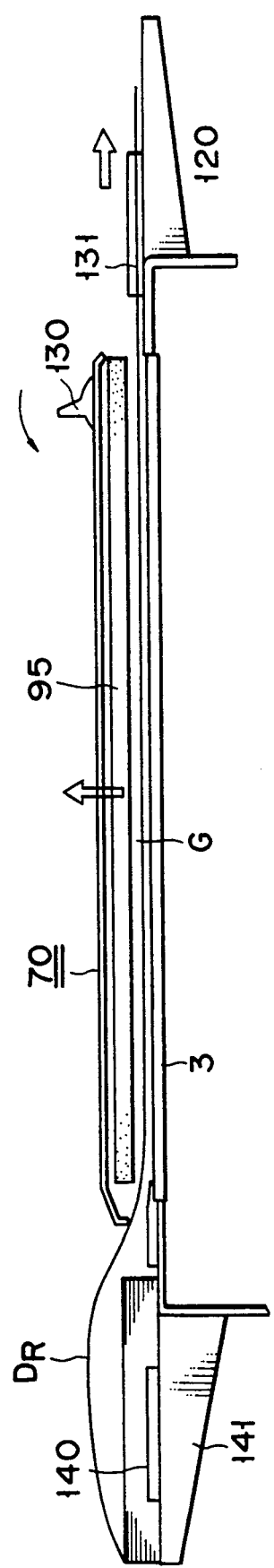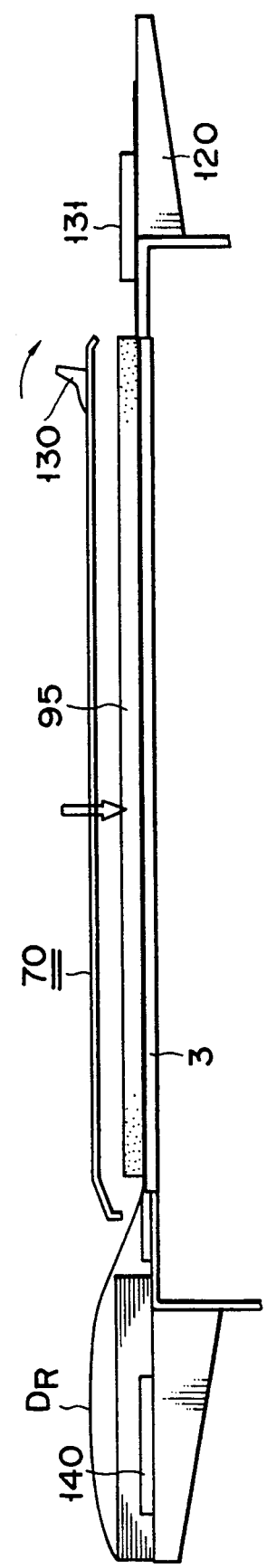
FIG. 15
FIG. 16

5,060,018

IMAGE FORMING APPARATUS

BACKGROUND OF THE INVENTION

1. Field of the Invention

The present invention relates to an image forming apparatus such as an electronic copying machine for forming an image corresponding to, e.g., document paper set on a document table and, more particularly, to an image forming apparatus suitable for image formation of continuous document paper such as continuous business form paper.

2. Description of the Related Art

In a conventional image forming apparatus, an image corresponding to a predetermined portion of continuous document paper set between a document table and a document press cover is performed first. An image corresponding to the next portion is formed in the following manner. The document press cover is opened, and the continuous document paper is subsequently conveyed to set the next portion on the document table. Thereafter, the document press cover is closed to perform image formation. That is, in the conventional image forming apparatus, continuous document paper set between the document table and the document press cover cannot be conveyed while the document press cover is closed. For this reason, image formation by this apparatus requires a very cumbersome series of operations and a long period of time.

SUMMARY OF THE INVENTION

It is an object of the present invention to provide an image forming apparatus which can easily and efficiently perform image formation using continuous document paper without alternately opening and closing a document press cover.

It is another object of the present invention to provide an image forming apparatus which can be applied to both image forming operations using continuous document paper and separate document sheets.

In order to achieve the above objects, according to the present invention, there is provided an image forming apparatus for forming an image corresponding to an original document placed on a document table, comprising means for supporting the original document together with the document table. The supporting means includes a cover member defining a gap which allows the original document to be projected from the supporting means when the original document is in a supported state, and a movable member which is movable within the cover member such that the movable member is brought into contact with or is separated from the document table.

The image forming apparatus of the present invention further comprises means for separating the movable member from the document table in a state where the cover member covers the document table, said separating means including an operation member which extends from the cover member and which is operated to allow conveyance of the original document projected from the document table. According to the image forming apparatus of the present invention, original document set between the document table and the supporting means can be conveyed with the cover member being closed. Therefore, in comparison with the conventional apparatus in which paper feed is performed by alternately opening and closing the cover member, the apparatus of the present invention can more easily and efficiently perform image formation with respect to continuous document paper.

In addition, according to the image forming apparatus of the present invention, first and second means for mounting the original continuous document are arranged on both sides of the document table. With this arrangement, intermediate portion of the original continuous document can exist between the document table and the press member in a stable state, and hence image formation can be properly performed.

Furthermore, according to the image forming apparatus of the present invention, means for mounting the original continuous document is formed on the cover means. This allows a reduction in installation space for the apparatus main body.

Moreover, according to the image forming apparatus of the present invention which is designed to form image corresponding to continuous document paper and separate document sheets, means for feeding separate document is detachably mounted on the document table. With this arrangement, if the feeding means is detached, the apparatus can be applied to image formation using original continuous document.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2 to 5 show an image forming apparatus designed to automatically feed document sheets according to an embodiment of the present invention, in which;

FIG. 2 is a schematic perspective view showing an upper portion of the apparatus in a state wherein a platen cover of an automatic document feeder is open;

FIG. 3 is a schematic perspective view showing an arrangement of a document feed mechanism of the automatic document feeder;

FIG. 4 is a schematic perspective view showing an arrangement for automatically switching a platen sheet displacing means; and FIG. 5 is a view for explaining an operation of the automatic document feeder;

FIGS. 6 to 13 show an image forming apparatus for continuous document paper according to another embodiment of the present invention, in which;

FIG. 6 is a schematic perspective view showing an upper portion of the apparatus;

FIG. 7 is a schematic perspective view showing an upper portion of the apparatus with a platen cover being open;

FIG. 8 is a schematic longitudinal sectional view showing an internal arrangement of the overall apparatus;

FIG. 9 is a schematic perspective view showing an arrangement of guide members for continuous document paper;

FIG. 10 is a view showing a state wherein the operation lever is switched to raise the platen sheet so as to feed continuous document paper;

FIG. 11 is a view showing a state wherein the operation lever is switched to cause the platen sheet to urge the continuous document paper against a document table;

FIG. 12 is a schematic perspective view showing an arrangement for manually switching a platen sheet displacing means by the operation lever; and FIG. 13 is a view showing a mechanism around the operation lever; and FIGS. 14 to 16 show an image forming apparatus for continuous document paper according to another embodiment of the present invention, in which:

FIG. 14 is a schematic perspective view showing an upper portion of the apparatus;

FIG. 15 is a view showing a state wherein an operation lever is switched to raise a platen sheet so as to feed continuous document paper; and FIG. 16 is a view showing a state wherein the operation lever is switched to cause the platen sheet to urge the continuous document paper against a document table.

DETAILED DESCRIPTION OF THE PREFERRED EMBODIMENT

Embodiments of image forming apparatuses of the present invention will be described in detail below with reference to the accompanying drawings.

FIGS. 2 to 5 show an image forming apparatus on which an automatic document feeder is mounted to automatically feed document sheets.

Figure 2:
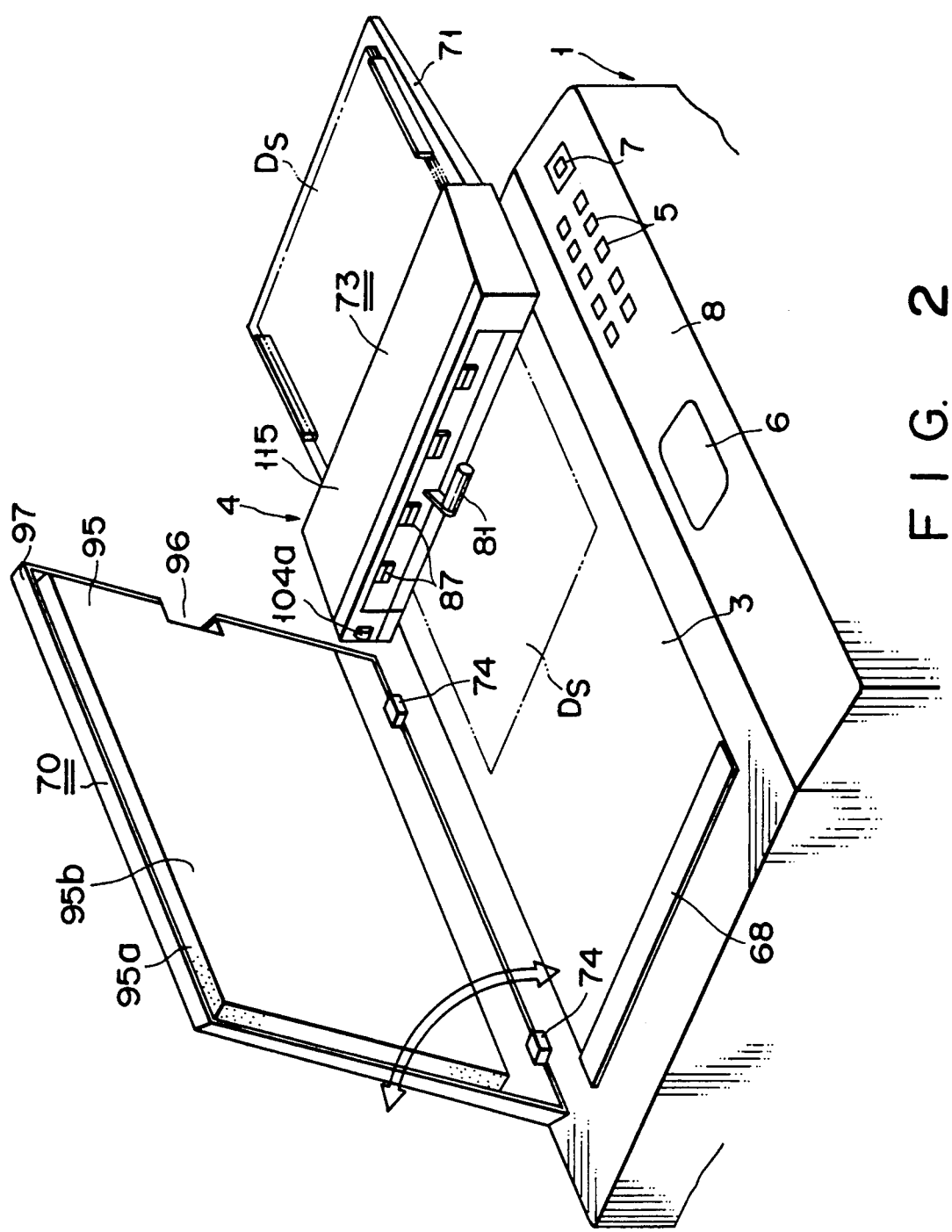

Referring FIG. 2, reference numeral 1 denotes an apparatus main body incorporating an image formation process constituting means for performing charging, exposure, developing, transferring, cleaning, and fixing. An automatic document feeder (ADF) 4 is arranged on the upper surface of the apparatus main body 1. The automatic document feeder 4 serves to automatically set a document sheet $D_S$ on a document table (to be referred to as a platen glass hereinafter) 3 or to discharge a document sheet $D_S$ from the platen glass 3. In addition, an operation panel 8 is arranged on the front side of the upper surface of the apparatus main body 1. As shown in FIG. 2, a ten-key pad 5, an instruction display portion 6, a copy key, and the like are arranged on the operation panel 8.

As shown in FIG. 2, the automatic document feeder (ADF) 4 is substantially constituted by a cover member (to be referred to as a platen cover hereinafter) 70 for covering the platen glass 3, a document tray 71 in which a plurality of document sheets $D_S$ can be collectively set, and a document feed mechanism 73 for sequentially picking up the document sheets $D_S$ on the document tray 71 one by one, feeding it into a space between a movable member (to be referred to as a platen sheet hereinafter) 95 (to be described later) of the platen cover 70 and the platen glass 3 so as to set it with reference to the right scale 67 (see FIG. 5), and discharging the set document sheet $D_S$ from the space between the platen sheet 95 of the platen cover 70 and the platen glass 3 upon completion of a copying operation so as to store it in a discharged paper storage portion 72.

The rear side of the platen cover 70 is attached to the apparatus main body 1 through hinge members 74 (see FIG. 2). The platen cover 70 can be opened to open the upper surface of the platen glass 3 as shown in FIG. 2, and can be closed to cover the platen glass 3. Note that the hinge members 74 can be pulled upward and removed from the apparatus main body 1. Therefore, when a thick document such as a book is to be copied, the document can be uniformly pressed by the platen cover 70 while the platen sheet 95 is kept parallel to the platen glass 3.

Figure 3:
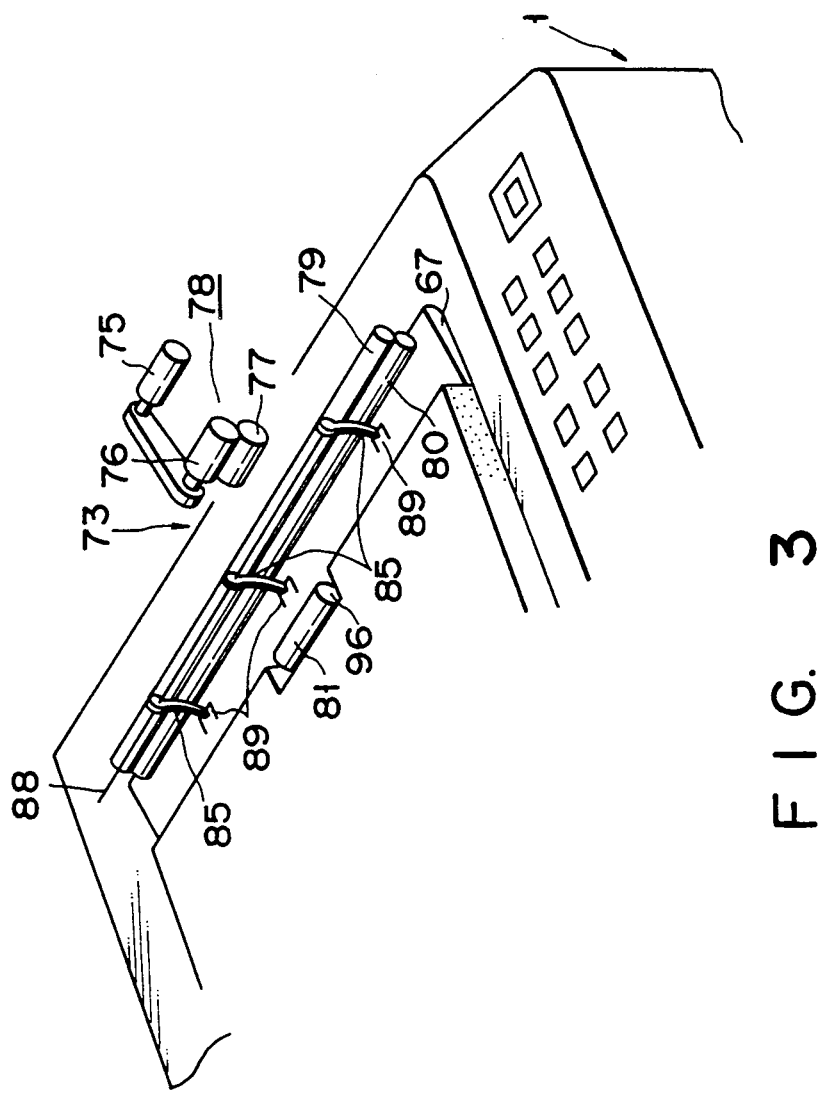
Figure 4:
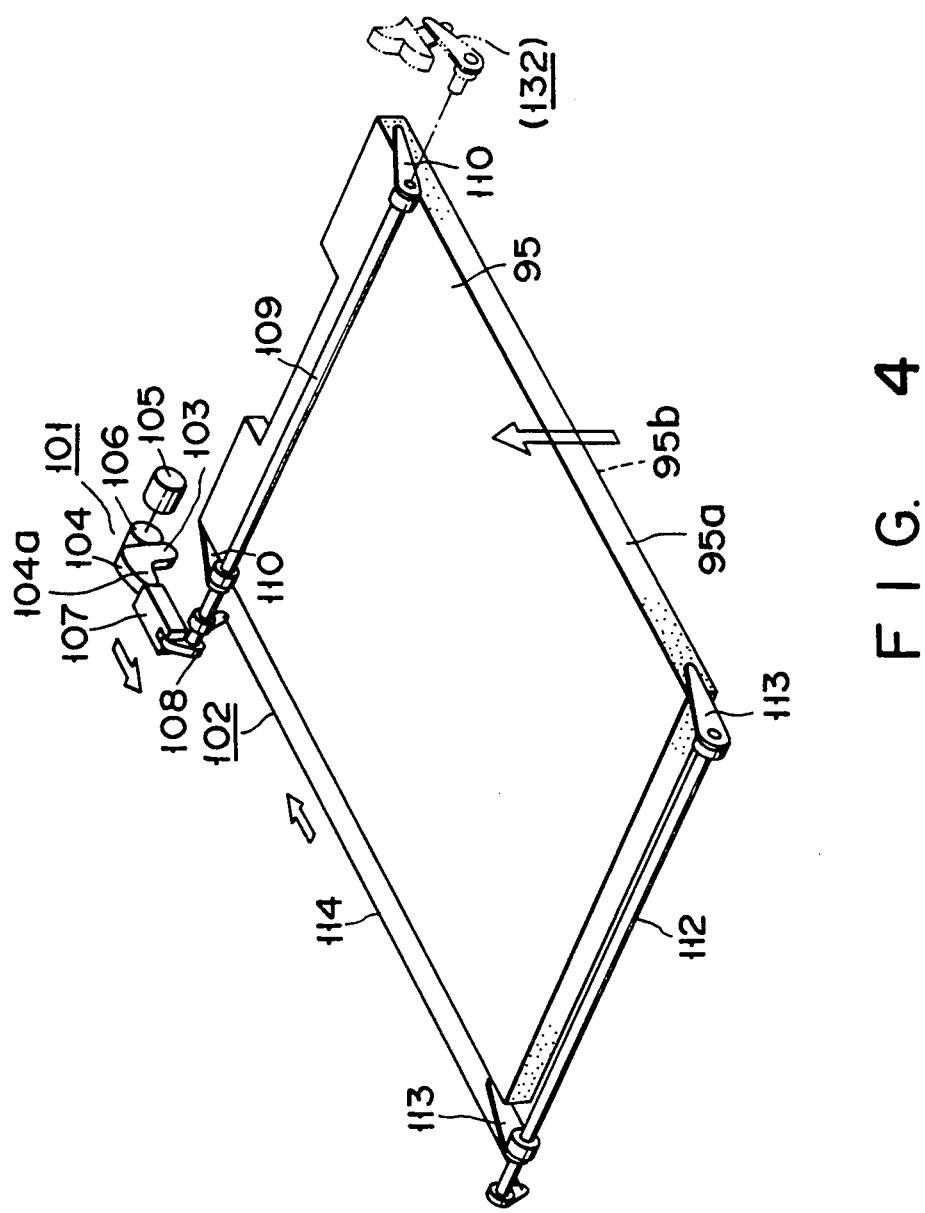

As shown in FIG. 3, the document feed mechanism 73 includes a pickup roller 75 arranged to oppose a document sheet $D_S$ set on the document tray 71 and to be vertically movable, a one-sheet pickup means 78 constituted by a feed roller 76 and a separating roller 77, and a registration roller pair 79. Each of these rollers is rotated in a predetermined direction through a driving system (not shown). The above-mentioned right scale 67 is mounted on the platen glass 3 so as to be freely pivoted about the axis of a lower roller 80 of the registration roller pair 79, and is driven by a solenoid (not shown).

A supply roller 81 is arranged on the left of the right scale 67, i.e., on the right end of the upper surface of the platen glass 3 so as to be in rolling contact with the platen glass 3. The supply roller 81 is selectively rotated by the driving system (not shown) in the forward and reverse directions so as to supply or discharge a document sheet $D_S$. In addition, a document discharge portion 82 is formed above the right scale 67. The document discharge portion 82 serves to discharge a document sheet $D_S$ discharged from the supply roller 81 to the discharged sheet storage portion 72 constituted by the upper surface of the platen cover 70. The document discharge portion 82 comprises a first guide plate 83 having a lower end portion arranged near the right scale 67, gates 85 and a second guide plate 86 arranged to form a document discharge path 84 between them and the first guide plate 83, and a discharge roller pair 87 arranged at an end portion of the document discharge path 84. The gates 85 are pivotally attached to a horizontal shaft 88 while their lower end portions are fitted in grooves formed in the upper surface of the free end side of the right scale 67 by their own weights.

The platen cover 70 has an arrangement shown in FIG. 2. More specifically, the platen sheet 95 has substantially the same size as that of the platen glass 3 and serves as a movable platen sheet which can be brought into contact with the platen glass and can be separated therefrom while the platen cover 70 is closed, as will be described later. The platen sheet 95 is constituted by an elastic member 95a as of urethane, and a white sheet 95b bonded to the lower surface of the elastic member 95a and having a small friction coefficient. The platen sheet 95 is bonded to a reinforcing plate (not shown) and has a notched portion 96 in its right side. The notched portion 96 serves as an space for the above-mentioned supply roller 81.

The platen sheet 95 is covered with a cover body 97, which has the rear side attached to the apparatus main body 1 through the hinge members 74, except for the lower surface. In addition, a compression spring (not shown) as a biasing means is arranged between the platen sheet 95 and the cover body 97 so as to always bias the platen sheet 95 downward, thus bringing the entire platen sheet 95 into tight contact with the platen glass 3.

The platen sheet 95 is displaced upward by a platen sheet displacing means 100 against the biasing force of the compression spring in a closed state of the platen cover 70, thus forming a gap G (see FIG. 5) between the sheet 95 and the platen glass 3. The platen sheet displacing means 100 comprises a driving mechanism 101 incorporated in the document feed mechanism 73, and a power transmitting mechanism 102, arranged on the platen cover 70 side, for transmitting power generated by the driving mechanism 101 to the platen sheet 95.

The driving mechanism 101 causes a pivotal press member (to be referred to as a pusher hereinafter) 104 to pivot about a shaft 103 as a fulcrum upon rotation of an eccentric cam roller 106 rotated by a cam motor 105 as a driving source. With this operation, an upper end projection 104a of the pusher 104 is caused to protrude/recede to/from the platen cover 70 side. Note that the pusher 104 is biased by a biasing means (not shown) to be always in contact with the outer surface of the eccentric cam roller 106.

The power transmitting mechanism 102 has the following arrangement. A slider 107 is arranged such that one end face of the slider 107 opposes the projection 104a of the pusher 104. The slider 107 can reciprocate in the protruding/receding direction of the projection 104a. In addition, the other end face of the slider 107 is coupled through a link mechanism 108 to one end of a right shaft 109 horizontally arranged between the cover body 97 and the platen sheet 95.

Pivot levers 110 are attached to the shaft 109. The pivot levers 110 respectively have guide rollers (not shown) to be fitted in guide grooves constituted by elongated holes respectively formed in front and rear surface portions of the right end side of the platen sheet 95. A sliding motion of the slider 107 is converted into a rotating motion of the shaft 109 by means of the link mechanism 108, so that the pivot levers 110 attached to the shaft 109 are caused to pivot through a predetermined angle.

In addition, a left shaft 112 is horizontally arranged to be parallel to the right shaft 109. Pivot levers 113 are attached to the shaft 112. The pivot levers 113 respectively have guide rollers (not shown) to be fitted in guide grooves constituted by elongated holes respectively formed in front and rear surface portions of the left end side of the platen sheet 95. The right and left shafts 109 and 112 are interlocked with each other through a link mechanism 114 so that the right and left pivot levers 110 and 113 simultaneously pivot in the same direction.

In the platen sheet displacing means 100 having the above-described arrangement, the smallest eccentric portion of the eccentric cam roller 106 is normally stopped in contact with the pusher 104 so as not to urge the end face of the slider 107. Therefore, any force to push up the platen sheet 95 is not generated, and the platen sheet 95 is horizontally pushed down by the biasing force of the compression spring, so that the entire surface of the platen sheet 95 is in tight contact with the platen glass 3.

At a feed or discharge timing of a sheet document $D_S$, the cam motor 105 is driven to rotate the eccentric cam roller 106 through 180° in response to a signal from a control section (not shown). The cam motor 105 is stopped when the largest eccentric portion of the eccentric cam roller 106 is brought into contact with the pusher 104 to cause the pusher 104 to pivot. As a result, the slider 107 is pushed by the projection 104a of the pusher 104. As described above, a sliding motion of this slider 107 is converted into a pivoting/displacing motion of each of the pivot levers 110 and 113, and the platen sheet 95 is pushed up against the biasing force of the compression spring. The lower surface of the platen sheet 95 is then separated from the platen glass 3 to form the gap G.

Referring to FIG. 2, reference numeral 115 denotes a cover for covering the document feed mechanism 73; and 116, a cover for covering part of the platen sheet displacing means 100 protruding from the upper surface of the cover body 97, i.e., part of the slider 107 and the link mechanism 108.

Figure 5:
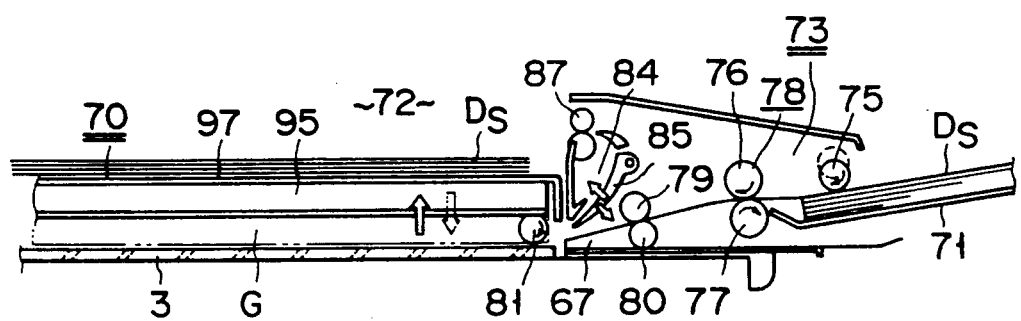

Feeding and discharging of document sheets $D_S$ to and from the platen glass 3 by means of the automatic document feeder (ADF) 4 will be described below with reference to FIG. 5.

After document sheets $D_S$ are collectively set on the document tray 71 with their document surfaces (on which information are written) facing down, the copy key 7 (see FIG. 2) is depressed. With this operation, the pickup roller 75 is moved downward to be brought into rolling contact with the uppermost document sheet $D_S$. At the same time, the pickup roller 75 and the feed roller 76 and separating roller 77 of the one-sheet pickup means 78 are rotated to feed the uppermost document sheet $D_S$ to the left. Meanwhile, as described with reference to FIG. 4, the driving mechanism 101 of the platen sheet displacing means 100 is operated, and the slider 107 is pushed by the pusher 104, thus forming the gap G between the lower surface of the platen sheet 95 and the platen glass 3.

The document sheet $D_S$ is brought into contact with the registration roller pair 79 which is not rotated, and the leading edge of the document sheet $D_S$ is aligned. Thereafter, the registration roller pair 79 is rotated to resume the conveyance of the document sheet $D_S$ to the left. In this case, the right scale 67 is in an upper position, and the gates 85 are urged by the document sheet $D_S$ to be pushed backward against their own weights. Subsequently, the document sheet $D_S$ is conveyed over the platen glass 3 to the left upon rotation of the supply roller 81.

After the trailing edge (right end) of the document sheet $D_S$ is conveyed to a position slightly separated from the distal end of the right scale 67 to the left, the document sheet $D_S$ is conveyed to the right upon reverse rotation of the supply roller 81, and the supply roller 81 is stopped while the right end of the document sheet $D_S$ is in contact with the right scale 67.

Subsequently, the driving mechanism 101 of the platen sheet displacing means 100 is operated again to release the urging operation of the pusher 104 with respect to the slider 107, and the platen sheet 95 is moved and restored to the horizontal state by the recovering force of the compression spring, thereby bringing the document sheet $D_S$, which is positioned with reference to the right scale 67, into tight contact with platen glass 3.

When setting of the document sheet $D_S$ is completed in this manner, a scanning operation is performed by the exposure unit 23 (see FIG. 8) in the apparatus main body 1. When this scanning operation is completed, the right scale 67 is moved downward, and the gates 85 are lowered by their own weight while the platen sheet 95 is moved upward to form the gap G. The document sheet $D_S$ is conveyed to the right upon rotation of the supply roller 81 and is guided to the document discharge path 84 due to the function of the gates 85. The document sheet $D_S$ is then discharged to the discharged document storage portion 72 through the discharge roller pair 87. Before the trailing edge of the document sheet $D_S$ discharged to the discharged document storage portion 72 passes through the discharge roller 87, the right scale 67 is moved upward, and a pickup/supply operation of the next document sheet $D_S$ proceeds up to the steps.

When copying of all the document sheets $D_S$ on the document tray 71 is completed, and the document sheets $D_S$ are stored on the discharged document storage portion 72 in this manner, the platen sheet 95 is moved downward, and the platen cover 70 becomes a normal cover.

Figure 1:
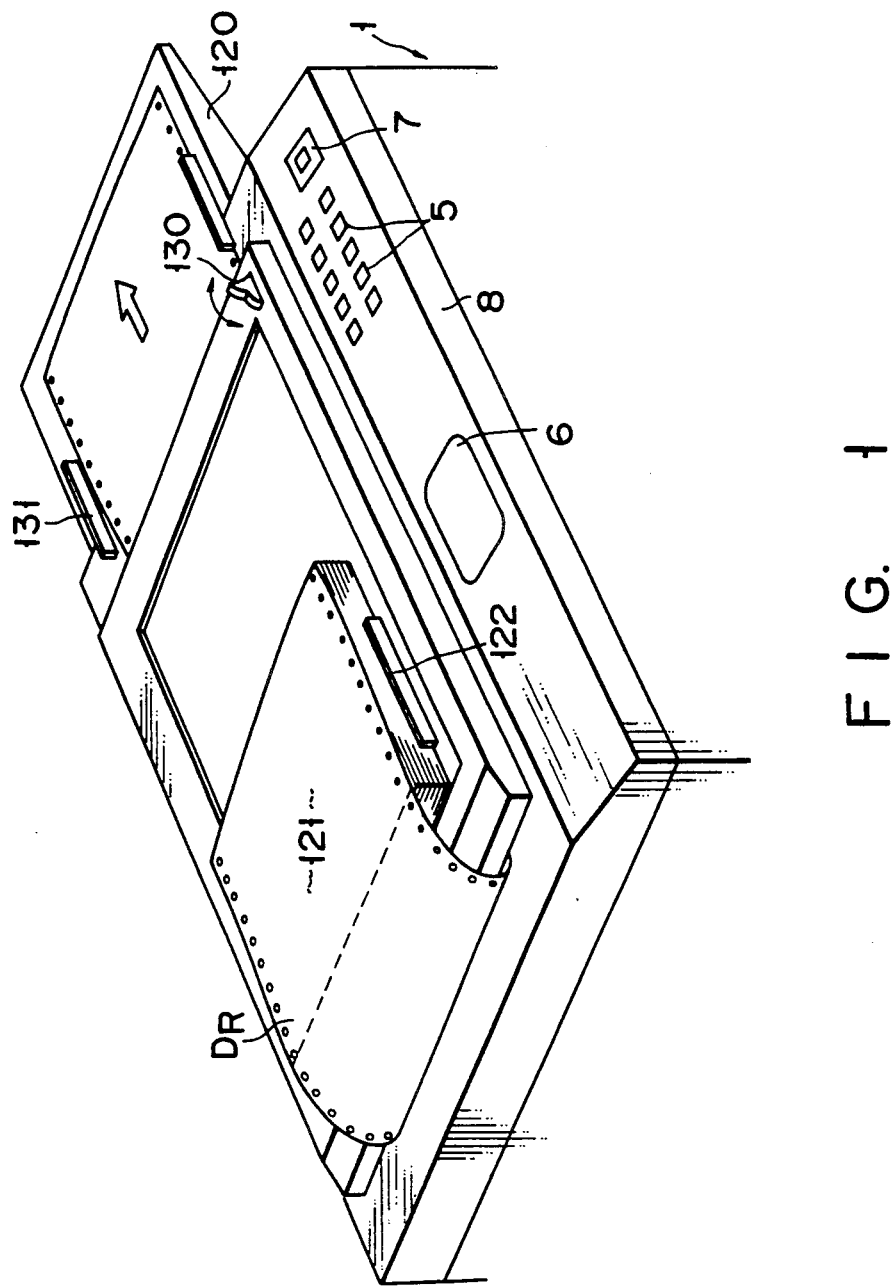
FIG. 1 is a schematic perspective view showing an image forming apparatus for continuous document paper.
Figure 6:
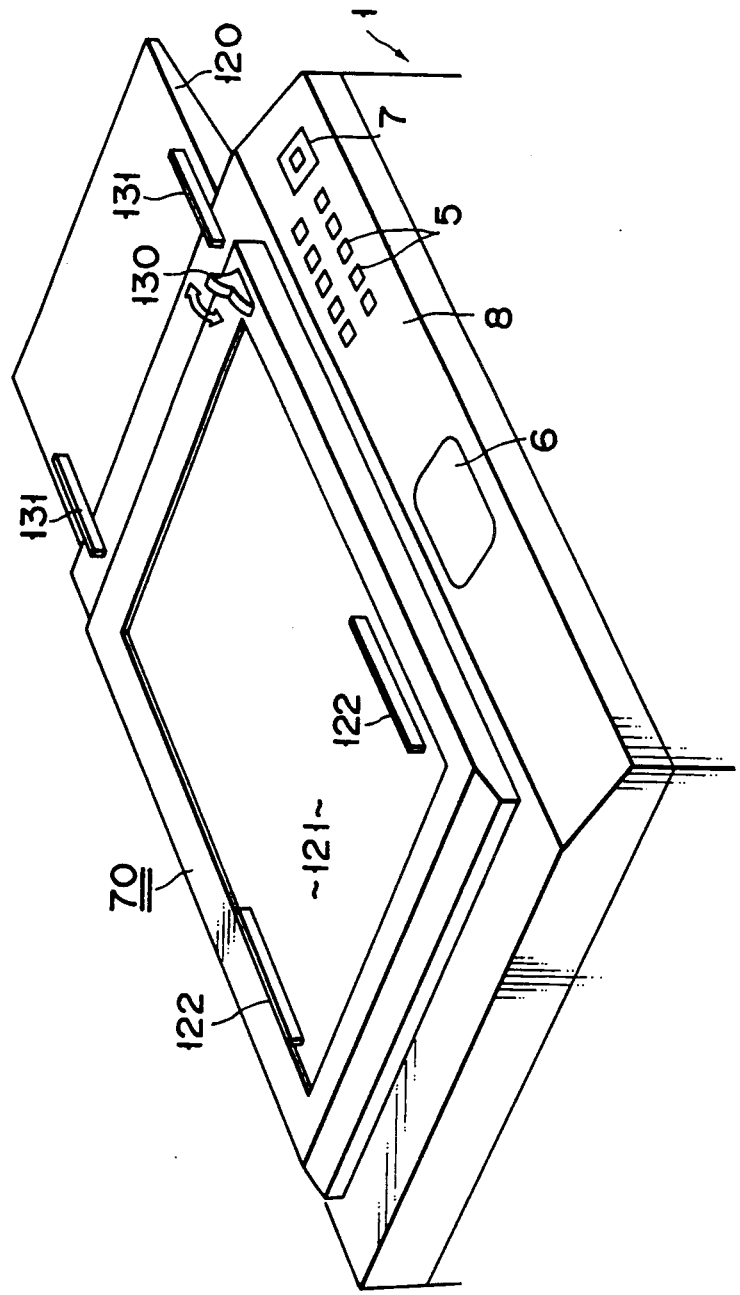
Figure 7:
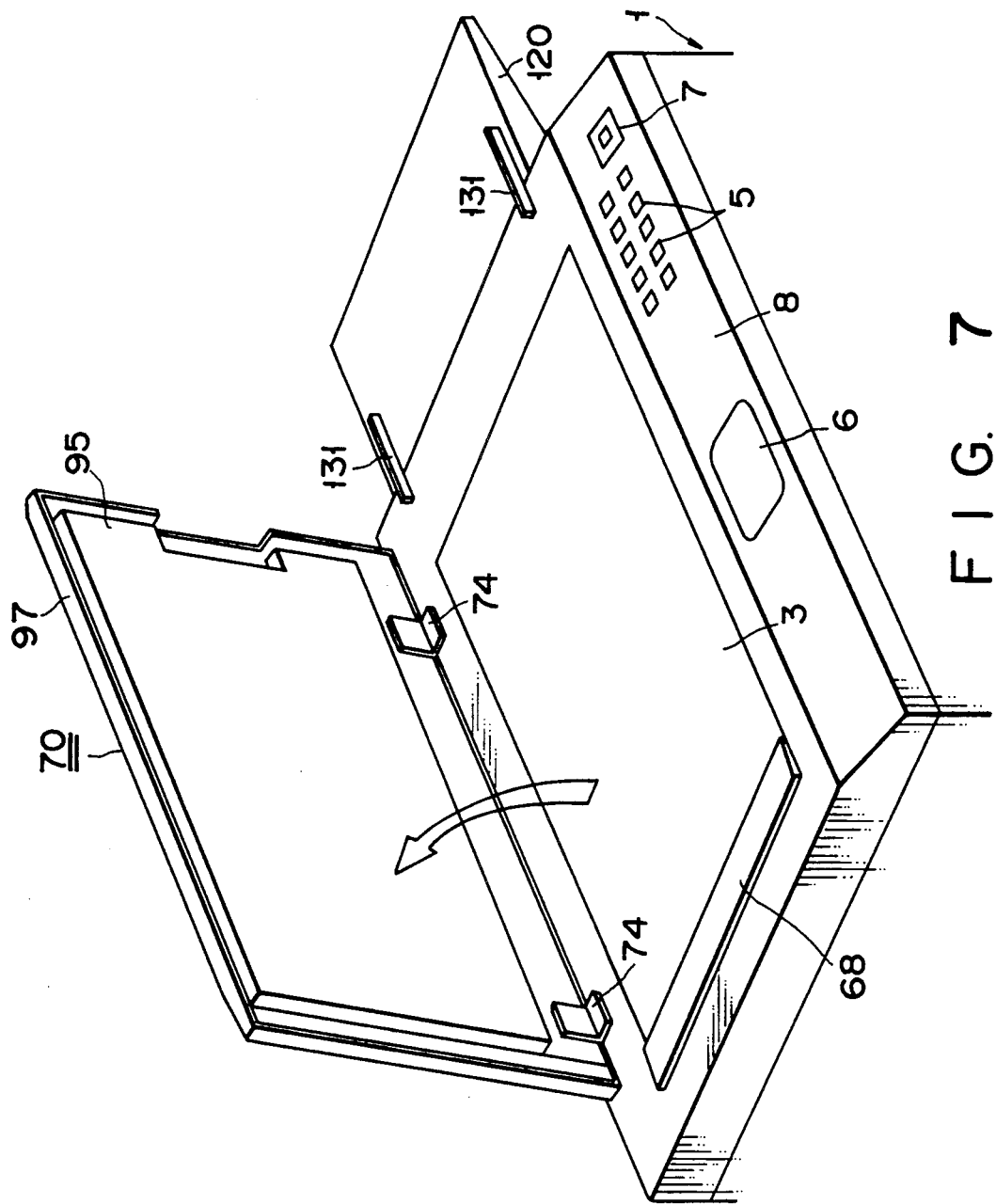

The image forming apparatus of the present invention can be used as an image forming apparatus designed to copy continuous document paper which is suitably used to copy continuous document $D_R$ such as continuous business form paper folded in a zigzag manner as shown in FIG. 1. In this case, the document feed mechanism 73 of the automatic document feeder (ADF) 4 is detached from the apparatus main body, and the document tray 71 is replaced with a continuous document paper tray 120, as shown in FIGS. 6, 7, and 8.

The image forming apparatus designed to copy continuous document paper will be described below with reference to FIGS. 1 and 6 to 13.

Figure 8:
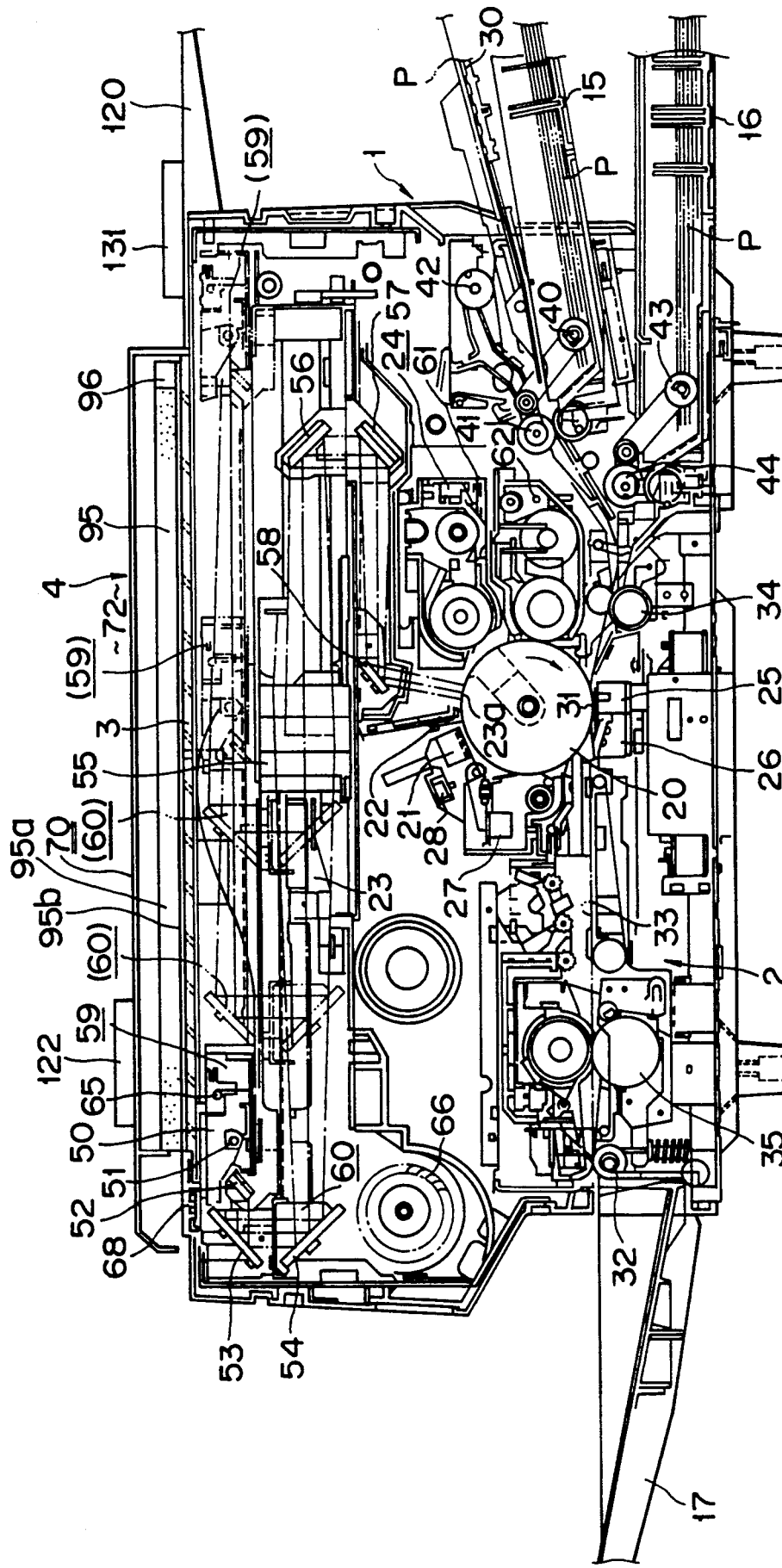

As shown in FIG. 8, first and second paper feed cassettes (to be respectively referred to as upper and lower cassettes hereinafter) 15 and 16 are mounted on the right side of the apparatus main body 1. The upper and lower cassettes 15 and 16 serve to store sheets P such as plain sheets to be supplied to the image formation process constituting means 2. A discharge tray 17, on which image-fixed paper sheets P are to be stacked, is mounted on the left side of the apparatus main body 1.

The image formation process constituting means 2 has the following arrangement. A drum-like photosensitive body 20 as an image carrier is arranged at a substantially central portion in the apparatus main body 1. The following components are sequentially arranged along the rotational direction of the photosensitive body 20: a charging unit 21, an erasing unit 22, an exposure portion 23a of an optical moving type exposure unit 23, a developing unit 24, a transfer unit 25, a separating unit 26, a cleaning unit 27, and a discharging unit 28, and the like.

In addition, a paper convey path 33 is formed in the apparatus main body 1. The paper convey path 33 serves to guide a sheet P automatically fed from the upper or lower cassette 15 or 16, or a sheet P manually fed through a manual paper feed tray 30 serving also as the cover of the upper cassette 15 to a discharge roller pair 32 at a left position in the apparatus main body 1 through an image transfer portion 31 between the photosensitive body 20 and the transfer unit 25.

An aligning roller pair 34 is arranged on the upstream side of the image transfer portion 31 on the paper convey path 33. A fixing unit 35 is arranged on the downstream side of the image transfer portion 31.

A pickup roller 40, a separating/conveying means 41 constituted by a convey roller and a separating roller, and a manual insertion pickup roller 42 are arranged near an attaching portion of the upper cassette 15. The pickup roller 40 is mounted on a swingable arm and serves to pick up sheets P one by one. The separating/conveying means 41 serves to receive a sheet P picked up by the pickup roller 40 and guide and convey it into a first branch convey path constituting the upstream side of the paper convey path 33. The manual insertion pickup roller 42 serves to guide a manually inserted sheet P into the first branch convey path through a gap between the convey roller and the separating roller of the separating/conveying means 41 which are separated from each other.

In addition, a pickup roller 43 and a separating/conveying means 44 constituted by a convey roller and a separating roller are arranged near an attaching portion of the lower cassette 16. The pickup roller 43 is mounted on a swingable arm and serves to pick up sheets P one by one. The separating/conveying means serves to receive a sheet P picked up by the pickup roller 43 and convey it into a second branch convey path constituting the upstream side of the paper convey path 33.

The exposure unit 23 causes an exposure lamp 51 having a rear portion covered with a reflector 50 to radiate light on a document sheet $D_S$ set on the platen glass 3 on the upper surface of the apparatus body 1, guides the light reflected by the sheet surface to a lens 55 through first, second, and third mirrors 52, 53, and 54, and guides the light transmitted through the lens 55 to the photosensitive body 20 through fourth, fifth, and sixth mirrors 56, 57, and 58.

The exposure lamp 51 covered with the reflector 50 and the first mirror 52 are mounted on a first carriage 59 which can freely reciprocate along the lower surface of the platen glass 3. The second and third mirrors 53 and 54 are mounted on a second carriage 60 which is moved at a speed ½ that of the first carriage in the same direction. When these carriages 59 and 60 are moved from left to right in the state shown in FIG. 3, the document sheet $D_S$ set on the platen glass 3 is scanned, and slit exposure is performed to form an image corresponding to the document sheet $D_S$ on the photosensitive body 20.

The developing unit 24 is constituted by an upper developing unit 61 for color development and a lower unit 62 for black development, and is designed to selectively perform development of black or other colors such as red.

A spot unit 65 is mounted on the first carriage 59. When, for example, a document sheet $D_S$ is to be copied without copying an image corresponding to a certain region, the spot unit 65 is used to designate this region. The erasing unit 22 is designed to erase charges of a portion corresponding to the region designated by the spot unit 65. A cooling fan 66 is arranged above the fixing unit 35 in the apparatus main body 1.

A document sheet $D_S$ having a maximum of A3 or P4 can be set on the platen glass 3 with reference to a right or left scale 67 or 68.

A continuous document paper tray 120 on which continuous document paper $D_R$ to be inserted between a platen glass 3 and a platen sheet 95 is mounted is formed on the left side of the upper surface of the platen cover 70.

A pair of guide members 122 for guiding both sides of the continuous document paper $D_R$ are arranged on the continuous document paper tray 121 so as to hold the continuous document paper $D_R$ at a predetermined position. As shown in FIG. 9, these guide members 122 are attached to rack members 124 which are interlocked with each other through a pinion 123. With this arrangement, the distance between the opposing surfaces of the guide members 122 can be adjusted with a center reference. Note that notched portions or the like are formed in the continuous document paper tray 121 so as to allow these guide members 122 to move, although they are not shown in the drawings.

The continuous document paper $D_R$ mounted on the continuous document paper tray 121 is fed to the left and is subsequently fed from the left side of the platen cover 70 so as to be set between the platen glass 3 and the platen sheet 95. In this state, a copying operation is performed.

After the continuous document paper $D_R$ is set, and the copying operation is completed, it is conveyed to the right to allow the next copying operation. Copying is sequentially performed by alternately performing these copying and conveying operations of the continuous document paper $D_R$.

An operation lever 130 is arranged on a front right portion of the upper surface of the platen cover 70. The operation lever 130 serves as an operation member for manually operating a power transmitting mechanism 102 of the above-mentioned platen sheet displacing means 100. If this operation lever 130 is tilted to the left, the platen sheet 95 is separated from the platen glass to form a gap G, as shown in FIG. 10. If it is tilted to the right, the platen sheet 95 is brought into tight contact with the platen glass 3, as shown in FIG. 11.

When the continuous document paper $D_R$ is to be fed, the operation lever 130 is tilted to the left to form the gap G between the platen sheet 95 and the platen glass 3 as shown in FIG. 10. In this state, the continuous document paper $D_R$ can be fed by pulling it to the right. If the operation lever 130 is tilted to the right, the platen sheet 95 is lowered to bring a copy portion of the continuous document paper $D_R$ into tight contact with the platen glass 3, as shown in FIG. 11.

As described above, according to the image forming apparatus of the present invention, while the platen cover 70 is closed, feeding and urging operations of the continuous document paper $D_R$ can be performed by simply switching the operation lever 130. In comparison with the conventional apparatus in which the platen cover 70 is opened and closed for each feeding/urging operation, the apparatus of the present invention can easily and efficiently perform image formation with respect to the continuous document paper $D_R$.

Upon image formation, the continuous document paper $D_R$ is regularly folded at folded portions on the continuous document paper tray 120 in a zigzag manner according to the folds of the paper $D_R$.

Guide members 131 similar to the pair of guide members 122 of the continuous document paper mounting portion 121 are arranged on the continuous document paper tray 120 so as to guide both sides of the continuous document paper $D_R$. A shift in position and the of the continuous document paper $D_R$ can be reliably restricted by these guide members 122 and 131, and hence a proper copying operation without a positional error can be performed. The guide members 131 has the same structure as that shown in FIG. 9, i.e., they are attached to racks which are interlocked with other through a pinion.

A rotating motion of the operation lever 130 is transmitted to the power transmitting mechanism 102 of the platen sheet displacing means 100 through a torque link mechanism 132, as shown in FIG. 12. More specifically, the operation lever 130 is designed to pivot about a shaft 133 as shown in FIG. 13 in detail. In this state, the free end of a lever 135 attached to a shaft 109 on the left side of the power transmitting mechanism 102 is mounted on a lever push-up pin 134 protruding from this operation lever 130.

When the operation lever 130 is tilted to the left, the lever 135 is pushed up by the lever push-up pin 134 to cause the shaft 109 to pivot, and the platen sheet 95 is separated from the platen glass 3 to form the gap G, as indicated by alternate long and two dashed lines in FIG. 13. If the operation lever 130 is tilted to the right, the lever 135 is moved downward to bring the platen sheet 95 into tight contact with the platen glass 3, as indicated by solid lines in FIG. 13.

When the operation lever 130 is tilted to the left to form the gap G by separating the platen sheet 95 from the platen glass 3, the lever push-up pin 134 is slightly shifted to the left from a position immediately above the shaft 133 as the fulcrum of the operation lever 130. In this state, even if the operation lever 130 is released, it does not return to the former position. Therefore, the continuous document paper $D_R$ can be easily fed.

In the above-described image forming apparatus designed to copy continuous document paper, the continuous document paper tray 121 on which the continuous document paper $D_R$ is mounted is formed on the left side of the upper surface of the platen cover 70. However, the present invention is not limited to this, and an arrangement shown in FIGS. 14 to 16 may be employed.

More specifically, a first continuous document paper tray 141 having guide members 140 is arranged on one side of the apparatus main body 1 and the platen cover 70. The continuous document paper $D_R$ to be inserted between the platen glass 3 and the platen sheet 95 is mounted on the first continuous document paper tray 141. In addition, a second continuous document paper tray 12 having guide members 131 is arranged on the other side of the apparatus main body 1 and the platen cover 70. Upon image formation, the continuous document paper $D_R$ is mounted on this continuous document paper tray 120. In this case, the guide members 140 have the same structure as that shown in FIG. 9. That is, the guide members 140 are attached to racks which are interlocked with each other through a pinion.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An image forming apparatus for forming an image corresponding to an original document placed on a document table, comprising:
   means for supporting the original document together with the document table, said supporting means including:
   a cover member defining a gap which allows the original document to be projected from the supporting means when the original document is in a supported state, and a movable member which is movable within the cover member such that the movable member is brought into contact with or is separated from the document table; and
   means for separating the movable member from the document table in a state where the cover member covers the document table, said separating means including:

an operation member formed on the cover member to be manually operated; and means, located in said cover member, for moving said movable member onto or from said document table when said operation member is operated;

wherein said separating means is operated to allow conveyance of the original document projected from the document table.

2. An apparatus according to claim 1, wherein said separating means comprises the operation member for taking at least first and second positions, and driving means, connected to said operation member, for bringing said movable member into contact with said document table upon operating of said operation member to the first position, and separating said movable member from said document table upon operation of said operation member to the second position.

3. An apparatus according to claim 2, wherein said separating means further comprises means for fixing said operation member to the first and the second positions, respectively.

4. An apparatus according to claims 1, wherein said separating means comprises:

first lever means, arranged on said cover member for taking at least first and second positions, said first lever means having a pin protruding therefrom;

second lever means having a free end and a fixed end, for mounting said pin on said free end thereof, said second lever means being pushed up and down by said pin corresponding to said first lever means located at the first and the second positions, respectively;

a shaft attached to said second lever means and horizontally arranged on said movable member, said shaft being rotated in forward and reverse directions upon upward and downward motions of said pin; and third lever means, attached to said shaft, for separating said movable member from said document table and bringing said movable member into contact with said document table.

5. The image forming apparatus according to claim 1, wherein said supporting means further includes means for allowing said supporting means to pivot relative to said document table.

6. The image forming apparatus according to claim 1, wherein said supporting means includes means for allowing said supporting means to swing.

7. An image forming apparatus for forming images respectively corresponding to an original continuous document and an original separate document placed on a document table, comprising:

means for supporting the original document together with the document table, said supporting means including:

a cover member defining a gap which allows the original document to be projected from the supporting means when the original document is in a supported state, and a movable member which is movable within the cover member such that the movable member is brought into contact with or is separated from the document table;

means for separating the movable member from the document table in a state where the cover member covers the document table, said separating means including an operation member which extends from the cover member and which is operated to allow conveyance of the original document projected from the document table; and means, detachably arranged on said document table, for feeding, the separate document.

8. An apparatus according to claim 7, wherein said document table has a first side surface and a second side surface opposite thereto, and includes a first means, arranged on the first side surface, for mounting the original continuous document before image formation thereon, and a second means, arranged on the second side surface, for mounting the original continuous document after image formation thereon.

9. An apparatus according to claim 8, wherein said first mounting means comprises a first means for guiding both sides of the original continuous document, and means, connected to said first guiding means, for changing a width between said first guiding means; and said second mounting means comprises a second means for guiding both sides of the original continuous document, and means, connected to said second guiding means for changing a width between said second guiding means.

10. An apparatus according to claim 7, wherein said separating means comprises the operation member for taking at least first and second positions, and driving means, connected to said operation member, for bringing said movable member into contact with said document table upon operating of said operation member to the first position, and separating said movable member from said document table upon operating of said operation member to the second position.

11. An apparatus according to claim 10 wherein said separating means further comprises means for fixing said operation member to the first and the second positions, respectively.

12. An apparatus according to claim 7, further comprising a means, formed on said cover member, for mounting the original continuous document before image formation thereon.

13. An apparatus according to claim 12, wherein said mounting means on said cover member comprises means for guiding both sides of the original continuous document, and means, connected to said guiding means, for changing a width between said guiding means.

14. An apparatus according to claim 7, further comprising:

means, detachably mounted on said document table, for supplying the original separate document to said document feeding means, for mounting separate documents before image formation thereon; and means, detachably mounted on said document table at the same position as that of said separate documents mounting means, for mounting the original continuous document thereon.

15. An apparatus according to claim 7, wherein said separating means comprises:

a first means for bringing said movable member into contact with said document table and separating said movable member from said document table in response to image formation and feed signals for original separate document, respectively;

a second means for bringing said movable member into contact with said document table and separating said movable member from said document table in response to image formation and feed signals for original continuous document, respectively; and means for connecting said first bringing means to said second bringing means.

16. An apparatus according to claim 7, wherein said separating means comprises:

first lever means, arranged on said cover member, for taking at least first and second positions, said first lever means having a pin protruding therefrom;

second lever means having a free end and a fixed end, for mounting said pin on said free end thereof, said second lever means being pushed up and down by said pin corresponding to said first lever means located at the first and second positions, respectively;

a shaft attached to said second lever means and horizontally arranged on said movable member, said shaft being rotated in forward and reverse directions upon upward and downward motions of said pin; and third lever means, attached to said shaft, for separating said movable member from said document table and bringing said movable member into contact with said document table.

* * * * *